United States Patent [19]
Fillion et al.

[11] Patent Number: 6,013,754
[45] Date of Patent: Jan. 11, 2000

[54] CATALYST FREE PRIMER COATING COMPOSITIONS

[75] Inventors: Sylvain Fillion; Nick Tatavak, both of Houston, Tex.

[73] Assignee: Courtaulds Coatings, Inc. Heavy Duty Division, Houston, Tex.

[21] Appl. No.: 09/008,442

[22] Filed: Jan. 16, 1998

[51] Int. Cl.⁷ .................................................. C08G 77/04
[52] U.S. Cl. ............................................. 528/34; 427/387
[58] Field of Search ................................ 528/34; 427/387

[56] References Cited

U.S. PATENT DOCUMENTS

| | | | |
|---|---|---|---|
| 3,161,614 | 12/1964 | Brown et al. | 528/34 |
| 3,474,064 | 10/1969 | Hittmair et al. | 528/34 |
| 3,702,778 | 11/1972 | Mueller et al. | 117/75 |
| 4,839,456 | 6/1989 | Kent | 528/33 |
| 5,331,074 | 7/1994 | Slater et al. | 528/34 |

FOREIGN PATENT DOCUMENTS

| | | |
|---|---|---|
| 0 017 110 B1 | 5/1983 | European Pat. Off. . |
| 0 089 071 A1 | 9/1983 | European Pat. Off. . |
| 0 032 597 B1 | 11/1983 | European Pat. Off. . |
| 0 122 483 A1 | 10/1984 | European Pat. Off. . |
| 0 089 066 B1 | 11/1986 | European Pat. Off. . |
| 0 320 716 A2 | 6/1989 | European Pat. Off. . |
| 0 340 121 A1 | 11/1989 | European Pat. Off. . |
| 53-137231 | 11/1978 | Japan . |
| 53-137233 | 11/1978 | Japan . |
| 53-139653 | 12/1978 | Japan . |
| 60-137974 | 7/1985 | Japan . |
| 60-258271 | 12/1985 | Japan . |
| 1121390 | 5/1989 | Japan . |
| 1148372 | 6/1989 | Japan . |
| 1201377 | 8/1989 | Japan . |
| 1259076 | 10/1989 | Japan . |
| 1266171 | 10/1989 | Japan . |
| 1306479 | 12/1989 | Japan . |
| 1319518 | 12/1989 | Japan . |
| 1 307 001 | 2/1973 | United Kingdom . |
| 1 470 465 | 4/1977 | United Kingdom . |
| 1 581 727 | 12/1980 | United Kingdom . |
| 2 096 019 | 10/1982 | United Kingdom . |
| 2 141 436 | 12/1984 | United Kingdom . |
| 2 188 938 | 10/1987 | United Kingdom . |
| 2 192 400 | 1/1988 | United Kingdom . |

*Primary Examiner*—Melvyn I. Marquis
*Attorney, Agent, or Firm*—Gifford, Krass, Groh, Sprinkle, Anderson & Citkowski, P.C.

[57] ABSTRACT

Polydiorganosiloxane or polyhydroorganosiloxane compositions are prepared which are room-temperature curable without the presence of a catalyst and in particular an organotin catalyst. The compositions are useful as primer coating compositions to promote adhesion of room temperature vulcanizable (RTV) silicone rubber coatings, especially those RTVs containing polydiorganosiloxanes.

14 Claims, No Drawings

CATALYST FREE PRIMER COATING COMPOSITIONS

FIELD OF THE INVENTION

This invention relates to new compositions of matter, and more particularly to coating compositions for application to a substrate to promote adhesion of a room temperature vulcanizable (RTV) silicone rubber coating. The invention relates with greater particularity to the protection of aquatic surfaces from the fouling effects of such an environment and to preclude contamination of the environment by the coating compositions.

BACKGROUND OF THE INVENTION

Man-made structures such as watercraft hulls, power station cooling water inlets and outlets, buoys, oil drilling rigs and all manner of surfaces immersed or splashed by fresh and/or sea water are prone to fouling by aquatic organisms such as barnacles, mussels, green and brown algae and the like. The fouling caused by organisms adhering on mobile structures such as watercraft hulls impedes the movement of the craft through the water. Static structure fouling hampers inspection and modification, in addition to having untold effects on the wave energy absorption by the structure. Piping systems become narrowed through accumulation of organisms with the result of reduced flow rates and increased wear on pumping equipment.

To combat fouling, considerable attention has been directed to the development of improved RTV silicone rubber compositions. Ideally, an RTV is stable for an indefinite period when stored in the absence of moisture, and rapidly cures to a tack-free coating upon exposure to moisture. A problem typically associated with RTV silicone rubber coatings is the difficulty in making them adhere well to substrates. This problem is discussed in European Patent Application 16195, which proposes applying the RTV silicone rubber as a cladding on a fabric backing. This method necessarily introduces additional complexity associated with rubber application to the backing and smoothing the backing onto the substrate.

An alternative approach involves the various primer compositions applied to the substrate as an undercoating for an RTV silicone rubber. Such primers have included a cross-linkable silicone paste (U.S. Pat. No. 3,702,778). Primers have also been devised using mixtures of epoxy-silane and an alkene-containing silane, polyurethanes, various rubbers, aminosilane-containing silicone resins and chlorinated polyethylene for a limited class of surfaces.

The commercially most successful primers for RTV silicone foul-release rubber contain substances toxic to aquatic organisms. The metal containing catalysts necessary for curing of such primers is typically a source of such toxins. Because of the leaching of toxins from such coatings, otherwise useful primers are increasingly being regarded with disfavor. As a result, a need exists for a primer which does not contain markedly toxic materials.

Prior art primer compositions have relied on metal containing catalysts and in particular tin-based catalysts such as dibutyltin dilaurate and tributyltin chloride to speed the cure of a primer. U.S. Pat. No. 5,290,601 is a representative example of such a composition. The concentration of a metal-containing catalyst is a result of a compromise between pot life of the mixed material and the curing time of the coating once applied. Thus, the higher the catalyst concentration the shorter the pot life with an ensuing increase in cure rate. Conversely, low catalyst concentration may result in the cure reaction being incomplete and resulting in a high-tack, low molecular weight primer with unacceptable material properties.

A stop gap solution to obtain long pot life, fast cure times and avoid undue contact with undesirable metal catalysts, especially those containing tin, has involved separate packaging of the catalyst material. The net result of which being additional handling procedures.

DETAILED DESCRIPTION OF THE INVENTION

Thus, there exists a need for a primer composition adapted for the adherence of numerous types of RTV silicone rubbers, which has comparable pot life and cure rates at room temperature to prior art primers, but without the need for a catalyst therein. In one of its aspects, the present invention includes compositions resulting from the hydrolysis of a room temperature curable polydiorganosiloxane of the following formula in the presence of other hydroxyl functional groups:

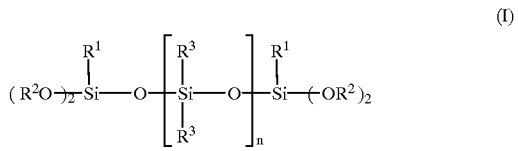

(I)

where $R^3$ can be the same or different R monovalent hydrocarbon radicals having 1 to 12 carbon atoms. $R^3$ is contained within the repeating unit of (I). Preferably, $R^3$ is an aliphatic radical. More preferably, $R^3$ is the same radical in both occurrences of Formula (I). Still more preferably $R^3$ is alkyl and illustratively: methyl, ethyl, hexyl or octyl. It is appreciated that aromatic, heterocyclic and substituted hydrocarbon radicals are also operative as $R^3$. $R^1$ radicals are preferably alkyl, for example methyl, ethyl, hexyl or octyl, alkenyl, for example, vinyl; aryl, for example phenyl; or aralkyl, for example benzyl. $R^2$ is such that O—$R^2$ is a(n): oximino, benzamido, acetoxy, or alkoxyl radical. Preferably, $R^2$ is chosen such that upon hydrolysis of the diorganopolysiloxane of Formula (I), O—$R^2$ forms a volatile compound. Thus, $R^2$ optionally contains less than 10 aliphatic carbon atoms. $R^2$ is contained within the terminal unit of (I). It is appreciated that mixtures of two or more room temperature curable polydiorganosiloxanes of Formula (I) may be used, if so desired.

The polydiorganosiloxane (I) is preferably used as such in the primer composition. However, it is appreciated that it is optionally replaced wholly or in part by a polyhydro-organosiloxane or the like. A polyhydro-organosiloxane has less reactive hydroxyl groups, as compared to a room temperature curable polydiorganosiloxane (I) and as such has different material properties upon cure. Furthermore, it is appreciated that curable functional groups —O$R^2$ which are shown as terminal groups in (I) are readily replaced by siloxanes having pendent curable functional groups.

The room temperature curable polydiorganosiloxane (I) is preferably a polydiorganosiloxane having sufficient repeating units so as to attain a viscosity of between 500 and 1 million centistokes at 25° C. The polydiorganosiloxane (I) is preferably produced by the reaction of a hydroxy terminated polydiorganosiloxane,

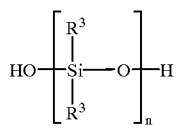

with a silane as shown below:

The radicals $R^3$, $R^1$ and $R^2$ are those described above in regard to Formula (I). Preferably, n (the repeat unit number) is chosen such that the viscosity of (II) is between 500 and about 1 million centistokes at 25° C. The reaction of a hydroxy-terminated polydiorganosiloxane of Formula (II) and a silane (III) occurs preferably under an inert atmosphere. Illustratively, an inert atmosphere consists of dry nitrogen, argon, or helium. The reaction of a hydroxy-terminated polydiorganosiloxane (II) and a silane (III) requires a stoichiometric ratio between II:III of at least 1:2. However, since the reaction of II and III is irreversible and its reaction product is highly moisture-sensitive, it is preferred that an excess of silane (III) is present relative to hydroxy terminated polydiorganosiloxane (II). Such an excess of silane assures shelf life stability of the room temperature-curable polydiorganosiloxane (I) under dry conditions.

The pot life and cure rate of the primer coating compositions of the instant invention is preferably controlled through the selection of a silane (III). While the identity of $R^2$ has a significant effect on the polarizability of a silane Si—O bond, the reactivity of $R^1$ has a more pronounced effect on the pot life and cure rate of the resulting coating composition. For example, vinyloximinosilane when utilized as a silane (III) generates a rapidly curing room temperature curable polydiorganosiloxane (I) when reacted with moisture. As a result, compositions of Formula (I) wherein $R^1$ is uniformly vinyl and $R^2$ is oximino, have a short pot life. In contrast, methyloximinosilane exclusively incorporated into a composition of Formula (I) wherein $R^1$ is uniformly methyl and $R^2$ is oximino is characterized by a slow curing reaction and a long pot life as compared to conventional primer compositions. Thus, in embodiments of the instant invention wherein silane (III) is an oximinosilane, it is preferred that $R^1$ be a mixture of methyl and vinyl radicals. More preferably, methyl and vinyl radicals constitute $R^1$ at a molar ratio of from 0:5 to 2:1, inclusive within (I).

Either during or subsequent to the reaction of a hydroxy terminated polydiorganosiloxane (II) and a silane (III) a variety of additives are optionally mixed into the reaction vessel. The additives illustratively include adhesion promoters such as aminosilanes, chlorinated polyolefins, and a variety of functionalized silanes; pigments, such as $TiO_2$ and iron oxide, and others as is known in the art; mineral fillers, such as surface-treated calcium metasilicate, mica and silica, and others as is known in the art; thixotropic agents; stabilizers, surfactants; anti-oxidants and plasticizers, as well as other additives, as is known in the art. A functionalized silane is defined herein as a silane having a moiety bonded thereto which is reactive, the moiety containing a heteroatom and/or a pi-bond therein. Optionally, pigments are included in the primer coating compositions of the instant invention so that upon being overcoated by a fouling release layer of clear RTV silicone rubber, the pigment is visible. When incorporating pigments or other additives, it is necessary to take precautionary steps to avoid any moisture from initiating premature curing of the room temperature curable polydiorganosiloxane (I). Optionally, the additive may also be a desiccant, included to scavenge trace moisture in the reaction vessel. The desiccant serving to lessen premature curing of the room temperature curable polydiorganosiloxane (I). The simplest precaution is to ensure that any additive used is thoroughly dry. Alternatively, the additives and pigments may be dispersed in a chemically compatible dilutant, preferably a polydiorganosiloxane. The additive is, for example, dispersed in a polydiorganosiloxane such as polydimethylsiloxane.

The primer compositions of the instant invention optionally contain an organic dilutant which for example is an aliphatic, cycloaliphatic or aromatic hydrocarbon (which can be optionally halogenated) such as n-heptane, n-octane, cyclohexane, methylcyclohexane, toluene, xylene, mesitylene, cumene, tetrahydronaphthalene, perchloroethylene, trichloroethane, tetrachloroethane, chlorobenzene or orthodichlorobenzene, an aliphatic or cycloaliphatic ketone such as methylethyl ketone, methylisobutyl ketone, methylisoamyl ketone, cyclohexanone or isophorone; an ether such as dialkyl ether of ethylene glycol or propylene glycol, or an ester such as ethylacetate, butylacetate or ethoxyethyl acetate. The weight ratio of dilutant to room temperature curable polydiorganosiloxane (I) is usually 1:50 to 20:1, preferably 1:10 to 3:1.

The primer compositions of the instant invention are particularly effective in promoting adhesion to organic resin substrates and metals. Such organic resin substrates illustratively include neoprene rubber, chlorinated rubber, block copolymer rubbers such as polystyrene/polybutadiene or polystyrene/poly(ethylene-butylene) rubbers, polyurethanes, epoxy coatings, vinyl coatings such as vinylchloride polymers or alkyd resins. These resins are typically found in the form of cladding in the case of neoprene and similar rubbers or may be present as previously applied coatings which are now to be covered by an RTV silicone rubber. The primer compositions of the instant invention are similarly well suited to promote adhesion to aluminum and steel.

The primer compositions of the instant invention are applied to a substrate by any known conventional coating technique. Typically the primer of the instant invention is applied by spray, brush or roller techniques.

The RTV silicone rubber fouling-release coating which is applied over the primer composition of the instant invention can, but does not have to be based on a polydiorganosiloxane terminating in silicon-bonded hydrolyzable groups as described above and illustratively included silicon-bonded ketiminoxy or acyloxy groups. For most applications it is preferred that the silane (III) or silicon bonded hydrolyzable groups (O—$R^2$) in the room temperature curable diorganopolysiloxane (I) of the primer composition or silicon bonded hydrolyzable groups in the RTV silicone rubber are the same. The RTV silicone rubber coating preferably includes a nonreactive silicone oil, for example of the formula $Q_3Si$—O—$(SiQ_2$—O—$)_jSiQ_3$, where each group Q represents a hydrocarbon radical having from 1 to 10 carbon atoms and j is an integer such that the silicone oil has a viscosity of 20 to 5,000 m Pa s. At least 10% of the groups Q are generally methyl groups and at least 2% of the groups Q are preferably phenyl groups. Most preferably, at least 25% of the —$SiQ_2$—O— units are methylphenylsiloxane units. Most preferably, the nonreactive silicone oil is a methyl terminated poly(-methylphenylsiloxane). The oil preferably has a viscosity of 20 to 1,000 m Pa s and is preferably used at 1 to 50%, most preferably 2 to 20% by weight based on the RTV silicone rubber. An example of the preferred nonreactive silicone oil is sold under the name RHODORSIL HUILE 550. The nonreactive silicone oil improves the resistance of the composition to aquatic fouling.

In place of or in addition to the nonreactive silicone oil, the RTV silicone rubber composition optionally contains a nonreactive fluid organic hydrocarbon, for example a lubricating mineral oil such as white oil, a low molecular weight polybutene or petrolatum or liquid paraffin/petrolatum mixture. Such a nonreactive fluid organic hydrocarbon is preferably absent from the primer composition.

A primer composition of the instant invention improves the overall adhesion of an RTV silicone rubber to a substrate to a greater extent than is achieved in its absence. The room temperature curable polydiorganosiloxane (I) tends to limit the absorption of the primer composition into the substrate, allowing a lag time of, for example, up to a week or even longer in which the overcoating with an RTV silicone rubber compound is achieved with good adhesion.

In order to form the primer coating compositions of the instant invention, the room temperature curable polydiorganosiloxane (I) is applied to the substrate in the presence of water. Typically atmospheric moisture is sufficient to hydrolyze the compound of Formula (I) so as to form reactive hydroxyl groups as shown in Formula (IV):

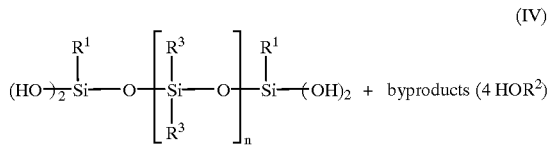

(IV)

The reactive hydroxyl groups of the polysiloxane (IV) undergo a condensation chain extension reaction in the presence of other hydroxyl sites. Sources of condensation chain extension functional groups illustratively include adhesion promoters, pigments, mineral fillers and the like mixed with the room temperature curable polydiorganosiloxane (I); molecules created in situ as a result of the reaction of species (II) and (III) and/or those involving the aforementioned additives; and other hydroxy containing molecules mixed with the room temperature curable polydiorganosiloxane (I) prior to application to the substrate. These other molecules added prior to application to the substrate illustratively include silanols, organic acids, alcohols and hydroxy terminated siloxanes. Preferably, the functional group is a hydroxyl. More preferably, the added molecules capable of chain extension condensation reaction with the siloxane (IV) is a hydroxy terminated polydiorganosiloxane, as shown in Formula (II) in the form of a base component composition. Still more preferably, hydroxy terminated polydimethylsiloxane is used. The repeat unit of the hydroxy terminated polydimethylsiloxane being of a large enough number such that the viscosity is between 500 and 1 million centistokes at 25° C. It is appreciated that the various additives mixed with room temperature curable polydiorganosiloxane (I) are also suitable for mixing with the base composition. The functional groups may be either pendant or terminal. The invention is further illustrated by the following examples in which parts and percentages are by weight. The description of particular embodiments is not intended to limit the invention to the specific embodiments, but rather to illustrate the breadth of alternatives, modifications and equivalents that may be included within the scope as defined in the appended claims.

EXAMPLE 1

A reactive room temperature moisture curable catalyst free polydiorganosiloxane is created by blending 57.7 parts by weight of a hydroxy-terminated polydimethylsiloxane having a viscosity of 3500 centistokes at 25° C. (RHODORSIL 48V3500 from Rhone-Poulenc), 6.4 parts by weight of a hydroxy-terminated polydimethylsiloxane having a viscosity of 20,000 centistokes at 25° C. (Elastomer 20N, from Wacker), and 7.6 parts by weight of xylene.

The above blend is mixed at least for 5 minutes. Followed by the addition of 1.3 parts by weight of N-(2-Aminoethyl)-3-aminopropyltrimethoxysilane (aminosilane, DYNASYLAN DAMO-T from Huls) and 1.3 parts by weight of an organomodified siloxane (silane, SILQUEST Y-11343 from WITCO Corporation/OSI Specialties Group). These two silanes (adhesion promoters) are preferably premixed before blending them with the above hydroxy-terminated polydimethylsiloxane polymers. 3.2 parts by weight of xylene are further added to the blend and mixed.

4.3 parts by weight of vinyloximinosilane (OS-2000 from Allied Signal) and 4.3 parts of methyloximinosilane (OS-1000 from Allied Signal) are then added to the above blend. However, the two oximinosilanes are preferably premixed prior to adding them in the above blend.

14.0 parts by weight of xylene are further added to the blend which is then further mixed.

The formulation is mixed under an atmosphere of dry nitrogen at 25° C. No catalyst is added to the formulation. This formulation has a shelf life stability greater than two weeks when properly sealed and stored at 40° F. to 90° F.

Upon application of the formulation to a clean suitable substrate, a clear primer coating composition resulted that is cured and amenable to overcoating with a RTV silicon rubber.

EXAMPLE 2

The same as Example 1 except that the order of addition is changed such that vinyloximinosilane/methyloximino silane (OS-2000/OS-1000) is added BEFORE the addition of the aminosilane/organomodified siloxane (DAMO-T/Y-11343).

EXAMPLE 3

The same as Example 1 except that 64.1 parts by weight of RHODORSIL 48V3500 are mixed into the blend with no Elastomer 20N being present.

EXAMPLE 4

The same as Example 1 except that 64.1 parts by weight of Elastomer 20N are mixed into the blend with no RHODORSIL 48V3500 being present.

EXAMPLE 5

As Example 1 except that 6.4 parts by weight of a hydroxy-terminated polydimethylsiloxane having a viscosity of 50000 centistokes at 25° C. (Elastomer 50N from Wacker) is substituted for the Elastomer 20N of Example 1.

EXAMPLE 6

Although the formulation of Example 1 can be used as a catalyst free clear primer coating composition, it also represents a reactor pack of a two pack catalyst free pigmented and colored primer coating composition. The formulation of Example 1 is mixed with an equal volume of a base pack component prior to the application on a suitable substrate. The base pack containing 22.3 parts by weight of RHODORSIL 48V3500 and 4.4 parts by weight of Elastomer 20N. 46.1 parts by weight of coloring and reinforcing pigments are then dispersed in the silicon polymers using also 1.1 parts by weight of a dispersing aid (Anti-Terra U from BYK CHEMIE). During the process, a total of 22.6 parts by weight of xylene is used to facilitate the manufacture of this product.

Finally, 3.6 parts by weight of a chlorinated polyolefin (adhesion promoter, CPO-515-2 from Eastman Chemical) is also added to the base pack formulation.

The base pack formulation is manufactured under an atmosphere of dry nitrogen at 25° C. The base pack has a shelf life stability of at least two weeks when properly sealed and stored at 40° F.–90° F.

Upon homogenizing the base pack with the reactor pack and application to a suitable substrate, a cure results without the presence of a catalyst to form a colored and pigmented primer coating composition amenable to overcoating with an RTV silicone rubber.

EXAMPLE 7

The reactor and base packs of Examples 1 and 6, respectively, are blended together under at atmosphere of nitrogen at 25° C. Thus creating a one pack pigmented reactive room temperature moisture curable catalyst free primer coating composition.

This one pack primer coating composition has a shelf life stability of at least two weeks when properly sealed and stored at 40° F.–90° F.

Upon application of this one pack primer coating composition to a clean suitable substrate, a cure results without the presence of a catalyst and amenable to overcoating with an RTV silicon rubber.

EXAMPLE 8

A reactive room temperature moisture curable catalyst free primer coating composition is created by blending 88 parts by weight of a mixture of hydroxy-terminated polydimethylsiloxanes having a viscosity of 3000–30,000 centistokes at 25° C. (80 parts RHODORSIL 48V3500 and 8 parts Elastomer 20N) with 6 parts by weight vinyloximinosilane (OS-2000) and 6 parts by weight methyloximinosilane (OS-1000). No catalyst is added to the formulation. The formulation is mixed in the absence of atmospheric moisture and under an atmosphere of dry nitrogen at 25° C. The formulation had a shelf life stability of greater than two weeks.

EXAMPLE 9

The above reactor formulation represents a reactor pack of a two pack catalyst free primer coating composition. The reactor formulation is mixed with an equal volume of a base pack component. The base pack containing a mixture of 80 parts 48V3500, 16 parts by weight Elastomer 20N, and 4 parts by weight of a chlorinated polyolefin (CPO-515-2 from Eastman Chemical). Upon homogenizing the base pack with the reactor pack and application to a neoprene rubber pipe segment, a cure results without the presence of a catalyst cure to form a primer coating composition amenable to overcoating with an RTV silicone rubber.

Upon application of the formulation to a clean aluminum substrate by roller application, a primer coating composition resulted that is tack free and amenable to overcoating with an RTV silicone rubber.

Modification 1

1.1 parts by weight of an aminosilane (DAMO-T from Huls) and 11.1 parts by weight of a silane (Y-11343 from OSI) are incorporated into the formulation of the reactor pack, in place of a similar number of parts of 48V3500. This modified reactor formulation is homogenized with the base pack and applied to a steel substrate. Upon cure in the presence of atmospheric moisture, a primer coating composition results which is amenable to overcoating with an RTV silicone rubber.

Modification 2

A dry pigment of titanium dioxide is dispersed in the base mixture of Example 9 at 2 parts by weight, in place of a similar number of parts of 48V3500.

Modification 3

The hydroxy-terminated polydimethylsiloxane of the reactor pack is replaced with a hydroxy terminated polydimethylsiloxane having a viscosity of about 20,000 centistokes (20N from Wacker).

Modification 4

The hydroxy-terminated polydimethylsiloxane contained within the base mixture is replaced with a hydroxy-terminated polydimethylsiloxane having a viscosity of 20,000 centistokes (20N).

Various modifications of the instant invention in addition to those shown and described therein will be apparent to those skilled in the art from the above description. Such modifications are also intended to fall within the scope of the appended claims.

We claim:

1. A method for priming a substrate to promote adhesion of a room temperature vulcanizable silicone rubber fouling-release coating to a substrate, before the substrate is exposed to a fouling environment, comprising:

applying to the substrate a composition which consists essentially of: a room temperature curable polysiloxane selected from the group consisting of: polyhydro-organosiloxane and polydiorganosiloxane, said polysiloxane having a first repeating unit of the formula:

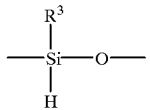

for polyhydro-organosiloxane and

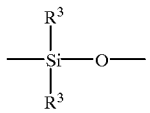

for a polydiorganosilane where $R^3$ is an aliphatic group having 1 to 12 carbon atoms and a terminal unit of the formula:

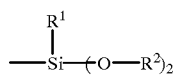

where $R^1$ is an aliphatic group having from 1 to 12 carbon atoms, where $R^2$ is such that $O-R^2$ is selected from the group of radicals consisting of: oximino, benzamido, acetoxy, and alkoxy, the radical having less than 10 carbon atoms, the terminal unit susceptible to hydrolysis under atmospheric conditions so as to form a reactive hydroxyl group, a compound having a condensation reactive group, said compound selected from a group consisting of silanol, silane, organic acid, alcohol and hydroxy terminated siloxane capable of undergoing a condensation reaction with the reactive hydroxyl group at room temperature and the condensation reaction proceeds without the presence of an organometallic catalyst;

an additive selected from the group consisting of: aminosilane, chlorinated polyolefin, functionalized silane, pigment, mineral filler, thixotropic agent, stabilizer, surfactant, anti-oxidant agent, plasticizer and desiccant; and allowing said composition to cure on the substrate.

2. The method of claim 1 wherein the condensation reactive group is selected from a group consisting of: pendent and terminal.

3. The method of claim 1 where $R^1$ is a mixture vinyl and methyl groups in a stichiometric ratio of from 0:5 to 2:1.

4. The method of claim 6 where $R^2$ is such that O—$R^2$ is oximino.

5. The method of claim 1 where $R^3$ is methyl.

6. The method of claim 2 where the condensation reactive group is a terminal —OH.

7. The method of claim 1 wherein said compound has a viscosity between 500 and 1 million centistokes at 25° C.

8. The method of claim 1, wherein said room temperature curable polysiloxane and said compound are stored as a one component pack prior to coating said substrate.

9. The method of claim 1 wherein said room temperature curable polysiloxane and said compound are stored in separate packs prior to coating said substrate.

10. The method of claim 1 wherein the catalyst is an organotin catalyst.

11. A method for priming a substrate to promote adhesion of a room temperature vulcanizable silicone rubber fouling-release coating to a substrate, before the substrate is exposed to a fouling environment comprising:

mixing a polydimethylsiloxane with an oximinosilane under an inert atmosphere to form a package;

applying the package in air to the substrate in the absence of a catalyst; and allowing the package to cure.

12. The method of claim 11 wherein the oximinosilane is selected from a group consisting of: methyl and vinyl.

13. The method of claim 12 wherein the oximinosilane is a molar ratio of methyl or vinyl oximinosilane from 0.5 to 2:1.

14. The method of claim 11 further comprising:

blending the package with a base pack prior to applying the package to the substrate, the base pack comprising: an additive selected from the group consisting of: aminosilane, chlorinated polyolefin, functionalized silane, pigment, mineral filler, thixotropic agent, stabilizer, surfactant, anti-oxidant agent, plasticizer and desiccant.

\* \* \* \* \*